(12) United States Patent
Hebert et al.

(10) Patent No.: US 9,350,749 B2
(45) Date of Patent: May 24, 2016

(54) APPLICATION ATTACK MONITORING

(71) Applicants: Cedric Hebert, Mougins (FR); Mohammad Ashiqur Rahaman, Nice—Rue Nueve (FR); Michael Vogel, Valbonne (FR)

(72) Inventors: Cedric Hebert, Mougins (FR); Mohammad Ashiqur Rahaman, Nice—Rue Nueve (FR); Michael Vogel, Valbonne (FR)

(73) Assignee: SAP SE, Walldorf (DE)

( * ) Notice: Subject to any disclaimer, the term of this patent is extended or adjusted under 35 U.S.C. 154(b) by 5 days.

(21) Appl. No.: 14/506,991

(22) Filed: Oct. 6, 2014

(65) Prior Publication Data

US 2016/0099953 A1 Apr. 7, 2016

(51) Int. Cl.
*G06F 11/00* (2006.01)
*G06F 12/14* (2006.01)
*G06F 12/16* (2006.01)
*G08B 23/00* (2006.01)
*H04L 29/06* (2006.01)

(52) U.S. Cl.
CPC ........ *H04L 63/1416* (2013.01); *H04L 63/1433* (2013.01)

(58) Field of Classification Search
CPC ............ H04L 63/1416; H04L 63/1441; H04L 63/1408; H04L 63/1425; G06F 2221/034

USPC .......................................................... 726/23
See application file for complete search history.

(56) References Cited

U.S. PATENT DOCUMENTS

| | | | |
|---|---|---|---|
| 7,386,785 B2 | 6/2008 | Ulmer et al. |
| 7,587,676 B2 | 9/2009 | Gomez et al. |
| 7,673,141 B2 | 3/2010 | Kilian-Kehr et al. |
| 7,685,536 B2 | 3/2010 | Hebert et al. |
| 8,468,598 B2 | 6/2013 | Hebert |
| 8,473,962 B2 | 6/2013 | Hebert et al. |
| 8,548,627 B2 | 10/2013 | Ulmer et al. |
| 8,689,352 B2 | 4/2014 | Schaad et al. |
| 8,726,151 B2 | 5/2014 | Rahaman et al. |
| 8,726,395 B2 | 5/2014 | Gomez et al. |

(Continued)

*Primary Examiner* — Kambiz Zand
*Assistant Examiner* — Stephen Sanders
(74) *Attorney, Agent, or Firm* — Fish & Richardson P.C.

(57) ABSTRACT

Implementations of the present disclosure include methods, systems, and computer-readable storage mediums for providing application attack monitoring. Actions can include: obtaining a security graph model associated with an attack vulnerability of a distributed application, the security graph model comprising a plurality of rule parts; screening log data obtained by a plurality of connectors to selectively obtain relevant log data corresponding to one or more of the rule parts, each connector being in communication with a respective components of the distributed application; evaluating the relevant log data based on the security graph model to provide an evaluation score; and in response to determining that the evaluation score is greater than a predetermined threshold, providing output indicating an attack on the distributed application.

18 Claims, 7 Drawing Sheets

(56) References Cited

U.S. PATENT DOCUMENTS

| | | |
|---|---|---|
| 8,744,892 B2 | 6/2014 | Reznichenko et al. |
| 8,775,127 B2 | 7/2014 | Gomez et al. |
| 8,819,131 B2 | 8/2014 | Hebert et al. |
| 2006/0168062 A1 | 7/2006 | Hebert et al. |
| 2007/0061589 A1 | 3/2007 | Ulmer et al. |
| 2007/0143403 A1 | 6/2007 | Ulmer et al. |
| 2007/0180036 A1 | 8/2007 | Hebert et al. |
| 2008/0077933 A1 | 3/2008 | Montagut et al. |
| 2008/0167983 A1 | 7/2008 | Kadir et al. |
| 2008/0184334 A1 | 7/2008 | Hebert et al. |
| 2008/0300834 A1* | 12/2008 | Wiemer .......... G06F 17/504 703/2 |
| 2009/0077376 A1 | 3/2009 | Montagut et al. |
| 2009/0327317 A1 | 12/2009 | Ulmer et al. |
| 2011/0231936 A1* | 9/2011 | Williams .......... G06F 21/577 726/25 |
| 2012/0030122 A1 | 2/2012 | Rahaman et al. |
| 2013/0160079 A1 | 6/2013 | Hebert |
| 2013/0262397 A1 | 10/2013 | Hebert |

\* cited by examiner

APPLICATION ATTACK MONITORING

BACKGROUND

The detection of intrusions into distributed applications is a complex problem. Current security tools primarily often focus on detecting attack patterns visible on the network, and are mostly used as means to detect attacks against the operating system (as opposed to the distributed application). In some cases, application vendors may be aware of existing vulnerabilities in their systems, but lack a means to effectively enable the customers of their products to be alerted in case a non-patched vulnerability is being exploited or if any of the application's weak points is being targeted.

SUMMARY

Implementations of the present disclosure include computer-implemented methods for application attack monitoring, the methods being performed by one or more processors. In some implementations, methods include actions of: obtaining, by the one or more processors, a security graph model associated with an attack vulnerability of a distributed application, the security graph model including a plurality of rule parts; screening, by the one or more processors, log data obtained by a plurality of connectors to selectively obtain relevant log data corresponding to one or more of the rule parts, each connector being in communication with a respective components of the distributed application; evaluating, by the one or more processors, the relevant log data based on the security graph model to provide an evaluation score; and in response to determining that the evaluation score is greater than a predetermined threshold, providing, by the one or more processors, output indicating an attack on the distributed application.

These and other implementations can each optionally include one or more of the following features: Obtaining the security graph model may include constructing the security graph model based on user-input received through a graphical user interface. The security graph model may include a rule tree, and the rule parts may be represented in the rule tree as nodes arranged in a hierarchical configuration. The nodes in the rule tree may be connected by dependency links representing a relationship between the rule parts. The log data may correspond to a plurality of events observed during execution by one or more components of the distributed application, and screening the log data may include identifying one or more events that correspond to events referenced in the rule parts of the security graph model. Screening the log data may further include storing the log data associated with the identified events in a log database, and discarding other log data. The actions may further include prompting evaluation of the relevant log data in response to detecting a trigger condition in the log data. The trigger condition may correspond to a predetermined event described by a rule part of the security graph model. Evaluating the relevant log data based on the security graph model may include executing a pattern matching algorithm. Providing output may include: accessing reference database to obtain information related to the attack vulnerability associated with the security graph model, and including the obtained information and the evaluation score in the output.

The present disclosure also provides one or more non-transitory computer-readable storage media coupled to one or more processors and having instructions stored thereon which, when executed by the one or more processors, cause the one or more processors to perform operations in accordance with implementations of the methods provided herein.

The present disclosure further provides a system for implementing the methods provided herein. The system includes one or more processors, and a computer-readable storage medium coupled to the one or more processors having instructions stored thereon which, when executed by the one or more processors, cause the one or more processors to perform operations in accordance with implementations of the methods provided herein.

It is appreciated that methods in accordance with the present disclosure can include any combination of the aspects and features described herein. That is, methods in accordance with the present disclosure are not limited to the combinations of aspects and features specifically described herein, but also include any combination of the aspects and features provided.

The details of one or more implementations of the present disclosure are set forth in the accompanying drawings and the description below. Other features and advantages of the present disclosure will be apparent from the description and drawings, and from the claims.

DETAILED DESCRIPTION

Implementations of the present disclosure are generally directed to systems, methods, and computer-readable media for application attack monitoring. In some implementations, the attack monitoring techniques described in the present disclosure are implemented in a distributed application setting across a shared platform. In some implementations, a vulnerability of the application can be described by a security graph model, e.g., a rule tree, including a plurality of discrete rule parts. The security graph can be modeled by a user operating a computing device with administrator privileges, autonomously provided through suitable security software, or delivered through a remote third party service. In some implementations, application attack monitoring may involve analyzing log data obtained during operation of the application. In some implementations, the log data is selectively obtained for analysis based on the discrete rule parts of the security graph. In some implementations, analysis of selected log data can include determining an evaluation score by applying the log data to the security graph, e.g., through a pattern matching algorithm, and comparing the evaluation score to a predetermined threshold. If the evaluation score is greater than the predetermined threshold, output indicating a possible attack on the application can be provided, e.g., to a user through the administrator computing device.

Figure 1:
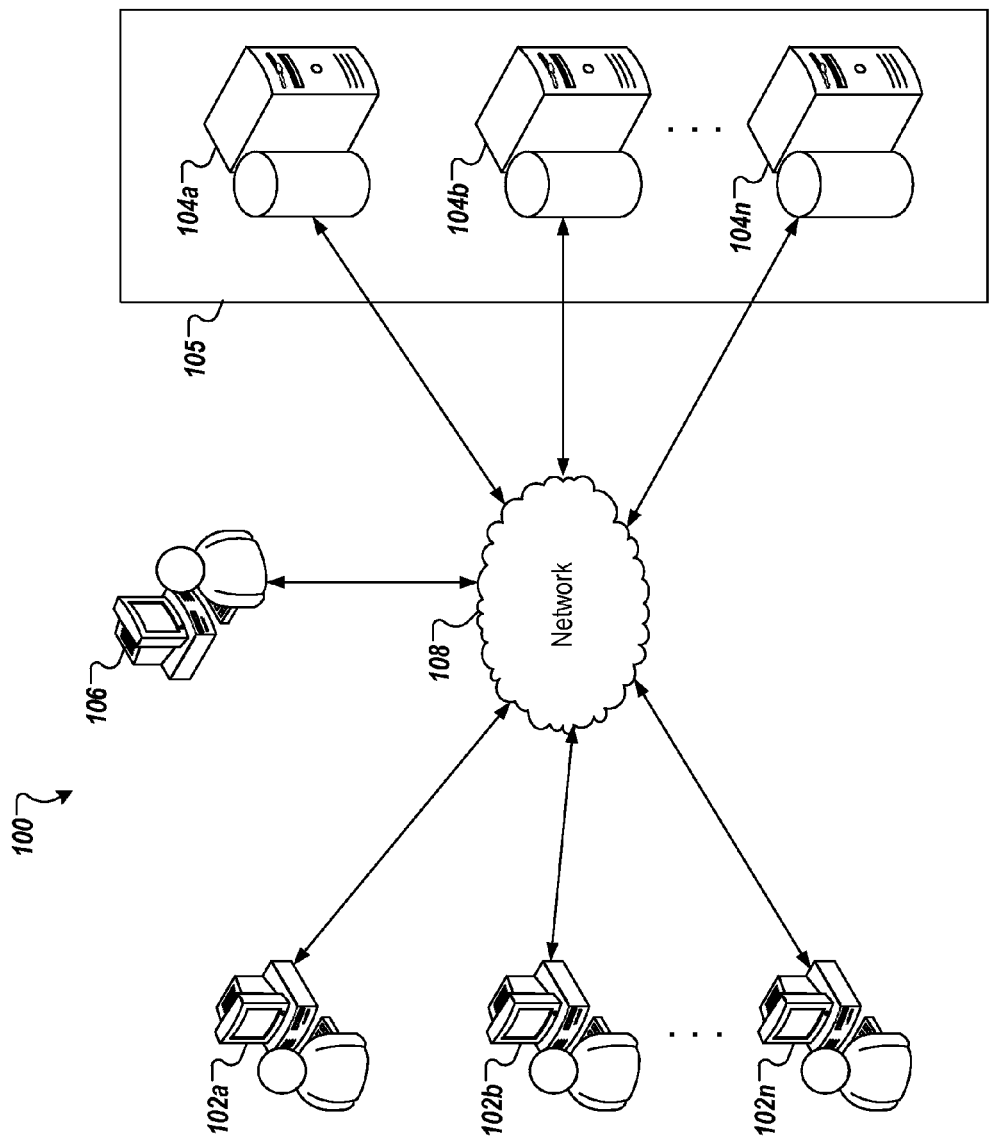
FIG. 1 depicts an example system architecture in accordance with implementations of the present disclosure.

FIG. 1 depicts an example system architecture 100 in accordance with implementations of the present disclosure. The example system architecture 100 includes a plurality of client-side computing devices (client devices) 102a-n, a plurality of server-side computing devices (server device) 104a-n, an administrator computing device (administrator device) 106, and a network 108. In general, the term "computing device" refers to any appropriate type of data processing device capable of running operating systems and application programs to perform server and/or client functions. Example computing devices can include a general-purpose personal computer (PC), Macintosh, workstation, UNIX-based workstation, a blade server, a handheld computer, a tablet computing device, a personal digital assistant (PDA), a smartphone, or any appropriate combination of any two or more of these data processing devices or other data processing devices.

The client devices 102a-n, the server devices 104a-n, and the administrator device 106 can communicate with one another over the network 108. In some implementations, the network 108 can include a large computer network, such as a local area network (LAN), a wide area network (WAN), the Internet, a cellular network, or a combination thereof connecting any number of mobile computing devices, fixed computing devices and server systems.

For purposes of illustration, and as discussed in further detail below, a user can operate any of the client devices 102a-n to interact with a networked application distributed across the server devices 104a-n. In some implementations, the distributed application, e.g., a business software product, can be built upon a common software platform (or architecture). The shared platform can be used as a basis upon which multiple components of the distributed application are developed and built upon. Thus, in this example, each of the server devices 104a-n includes an application component, e.g., an application, a processing resource, a database and/or a security system, e.g., a firewall or an intrusion detection system, built on a common platform 105. Application components hosted on the respective server devices 104a-n may be integrated with one another across the platform 105 to communicate and collaborate with one another in response to and in connection with one or more requests received from the client devices 102a-n. In some implementations, one or more of the server devices 104a-n may include a web-based application accessed and executed by the client devices 102a-n through the network 108. Regardless of the particular implementation, an "application" may include computer-readable instructions, firmware, wired or programmed hardware, or any combination thereof on a tangible and non-transitory medium operable when executed by one or more processors to perform at least the protocols, processes and operations described herein.

In some implementations, proprietary on-demand business process platforms can be used to create various on-demand software products built using at least a portion of the platform. In some implementations, on-demand products can be a fully integrated enterprise resource planning (ERP), or business management software solutions. The on-demand products can be a complete SaaS (software as a service) system in which software and its associated data are hosted centrally (for example, in the cloud computing environment), and are accessed by users using a thin client, e.g., a web browser, over the internet. Further, in some implementations, the distributed applications hosted by the server devices 104a-n may facilitate various other types of licensing and delivery models, including: infrastructure as a service (IaaS), platform as a service (PaaS), software as a service (SaaS), storage as a service (STaaS), security as a service (SECaaS), data as a service (DaaS), business process as a service (BPaaS), test environment as a service (TEaaS), desktop as a service (DaaS), and/or application programming interfaces (API) as a service (APIaaS).

In some implementations, the administrator device 106 is provided with administrator privileges for accessing and interacting with the settings and operations of a distributed application executed by the server devices 104a-n. In some implementations, the administrator privileges may be inherent with the administrator device 106 or associated with an administrator account of the user. As described below, the administrator device 106 may be capable of establishing or modifying an application-monitoring framework across the shared platform 105 of the server devices 104a-n.

In some implementations, the application-monitoring framework may include one or more security graph models relating to a potential vulnerability of the distributed application across the shared platform 105 of the server devices 104a-n. In other words, a security graph model may define the logical steps and parameters of a potential attack. In some implementations, one or more security graph models can be provided in the form of tree-type data structure (referred to as a "rule tree" herein). The rule tree may include one or more rule parts for conducting application attack monitoring, with each rule part corresponding to an event occurring during operation of the application that can be captured as log data. The rule parts can be bound together by dependency links. A dependency link binding two rule parts can be provided in the form of one or more Boolean expressions.

In some implementations, a rule tree can be expressed as a node graph including a plurality of nodes connected by edges. Each node of the graph may represent a discrete rule part of the tree, and each edge may represent a dependency link between the rule parts. In some implementations, a "root node" refers to the highest-level node in the graph; a "child node" refers to a node directly below a "parent node"; "sibling nodes" refer to nodes at the same level of the graph; and a "leaf node" refers to a node with no child nodes. In some implementations, a user may operate the administrator device 106 to create or modify a rule tree (or another appropriate type of security graph model) through an appropriate user interface (e.g., a graphical user interface (GUI)). For example, the administrator device 106 may provide a GUI supporting a drag-and-drop technique for binding one or more discrete rule parts.

As the distributed application is executed through the server devices 104a-n, data recording certain types of events is logged and selectively retrieved for analysis. In some implementations, an "event" is considered an action executed by one or more components of a distributed application. Such actions may include, direct message transmissions, publish-subscribe requests, account logins, data storage, creation of a new user account, and the like. Thus, the client devices 102a-n and/or the server devices 104a-n may produce numerous actions recorded as events during execution of the distributed application. In some implementations, log data describing the events can be maintained in log files stored in computer-readable memory across one or more components (e.g., the server devices 104a-n) of a distributed application. Log data can be retrieved from various log files and screened based on one or more rule trees included in the application-monitoring framework. For example, in some implementations, only log data corresponding to the events referenced in the discrete rule parts of the tree may be retained—and all other log data may be discarded. In some applications, this feature can mitigate any detrimental impact on system performance and disk space that may be caused by "over logging."

In some implementations, selectively obtained log data can be applied to a rule tree to determine whether an attack on the application is likely to have taken place. For example, the log data can be evaluated using an appropriate pattern matching algorithm based on the rule parts and dependency links of the rule tree to determine an evaluation score. The evaluation score may reflect a likelihood that an attack corresponding to the vulnerability modeled by the rule tree has taken place. In some implementations, the evaluation score is compared to a predetermined threshold, and if the evaluation score is greater than the threshold, an attack is determined to have taken place. In some implementations, evaluation of a rule tree can be initiated by a trigger condition. For example, a suitable trigger condition may include the detection of log data that fulfills a rule part corresponding to a leaf node in the rule tree.

Figure 2:
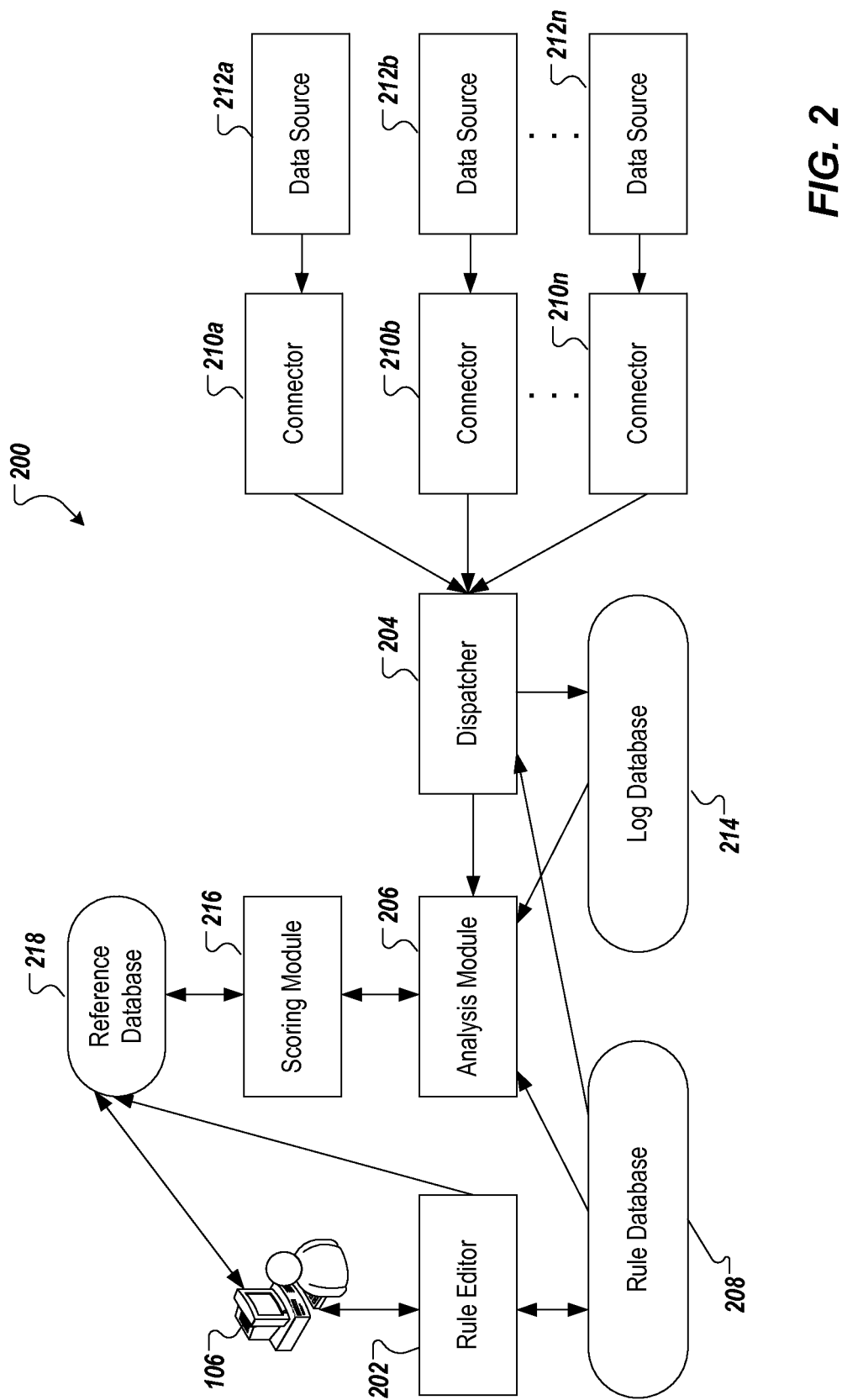
FIG. 2 depicts an example system for providing application attack monitoring.

FIG. 2 depicts an example system 200 for providing application attack monitoring. As shown, the system 200 includes a rule editor 202, a dispatcher 204, and an analysis module 206. In some implementations, a user operating the administrator device 106 can access the rule editor 202 to construct a rule tree modeling a vulnerability in a distributed application. As noted above, the rule editor 202 may provide a suitable user interface for defining multiple discrete rule parts and dependency links that bind the rule parts.

A rule part may correspond to a particular class of one or more events recorded in various log files. In some implementations, a rule part can be defined by specifying an event type identifiable in a log file and one or more attributes associated with the event type. The event type may characteristically describe the general nature of the action by the application component(s). The attributes relating to a specific event type may include any relevant information relating to the event. Suitable attributes may relate to: one or more user IDs, a time and/or date, a parameter value, a source application component, a destination application component, a server/system ID, and the like. In some implementations, a dependency link binding two rule parts can be defined by specifying one or more Boolean expressions based on the respective factors of the rule parts. Rule trees constructed using the rule editor 202 are stored in the rule database 208. The rule database 208 provides data related to the rule trees to the dispatcher 204 and analysis module 206. In some implementations, the dispatcher 204 may receive data describing the discrete rule parts of one or more rule trees. In some implementations, the rule editor 202 may provide the user options for selecting predefined event types and attributes based on currently available logging and log monitoring resources (e.g., data sources 212a-n and connectors 210a-n). Further, in some implementations, the rule editor 202 may allow the user to prompt the creation of new resources for logging and log monitoring to enable a desired rule part. Further still, in some implementations, the rule editor 202 may provide the user with options to reuse previously constructed rule parts and dependency links stored in the rule database 208.

The dispatcher 204 receives log data from a plurality of connectors 210a-n and screens the log data based on one or more discrete rule parts. For example, the dispatcher 204 may screen incoming log data provided by the connectors 210a-n and selectively retain log data that corresponds to one or more rule parts, while discarding log data that does not correspond to a rule part. Each of the connectors 210a-n is coupled to monitor and retrieve log data maintained by a respective data source 212a-n. In some implementations, one or more of the data sources 212a-n may include log files created by components of a distributed application (e.g., server devices 104a-n) operating on a shared platform (e.g., the platform 105). The log files may be stored locally by an application component or remotely by a third party monitoring service. In some implementations, the connectors 210a-n perpetually monitor log data stored at the corresponding data source 212a-n and provide new log data to the dispatcher 204.

Log data provided through the connectors 210a-n may be structured according to the different formats. Thus, in some implementations, the dispatcher 204 normalizes the various forms of log data. The dispatcher 204 may compare the normalized log data to the various rule parts, and retain or discard the log data based on the comparison. In some implementations, the dispatcher 204 may only retain log data that exactly matches the definition of a rule part. In some implementations, the dispatcher 204 may retain log data that matches a rule part within a threshold degree of similarity, e.g., X % similarity. Log data that is retained by the dispatcher 204 is stored in the log database 214. The dispatcher 204 may prompt the analysis module 206 to initiate evaluation of log data stored in the log database 214 in response to detection of a trigger condition. In some implementations, a trigger condition may occur when the dispatcher 204 identifies log data that matches a rule part corresponding to a leaf node in the respective rule tree (that is, a node without a child node). In some implementations, detection of a trigger condition may cause the dispatcher to prompt the analysis module 206 to evaluate all rule trees that the trigger condition is associated with.

In response to a prompt from the dispatcher 204, the analysis module 206 may retrieve log data relevant to a rule tree under examination from the log database 214. Log data may be considered relevant to the rule tree, if it corresponds to a rule part of the tree. The analysis module 206 can evaluate the log data by applying the rule parts and dependency links of the rule tree to the log data. In some implementations, the analysis module 206 may execute an appropriate pattern matching algorithm (e.g., a bottom-up, top-down, linear, or non-linear pattern matching algorithm) to compare the log data to the corresponding rule tree. In some implementations, a scoring module 216 determines an evaluation score based on the comparison of the log data to the rule tree and determines whether an attack prescribed by the rule tree is likely to have occurred based on the evaluation score. The evaluation score may be provided by the scoring module 216 as any quantitative or qualitative value describing the similarity between the log data and the rule tree. In some implementations, if the evaluation score is greater than a predetermined threshold value, the scoring module 216 may determine that an attack is likely to have taken place, and vice versa. In some implementations, the evaluation score describes the number of rule parts (which correspond to nodes of the tree graph) that have been satisfied by the log data. Thus, in some implementations, the predetermined threshold value can be set to a number of rule parts that must be matched to signal an attack. For example, the predetermined threshold value can be set to one. In this example, if any rule part is determined by the pattern matching routine to have been satisfied by the log data, then the scoring module 216 would determine that an attack is likely to have taken place. Of course, in various other examples, the predetermined threshold value can be set to any non-negative value. In some examples, the predetermined threshold value can be set to zero, such that detection of the trigger condition is sufficient to determine that an attack is likely to have taken place. Further, in some implementations, the predetermine threshold value may vary for different rule trees. For example, a rule tree that is more robust and complex may be associated with a higher predetermined threshold value to indicate an attack in order to limit false positive alerts.

In response to determining that an attack is likely to have taken place, the scoring module 216 may provide output indicating an attack on the distributed application to the administrator device 106. In some implementations, the output may include the evaluation score and/or information related to the rule tree that is stored in the reference database 218. The reference database 218 may contain information related to the severity of the attack and/or information about available patches to secure the vulnerability. In some implementations, information related to the rule tree is includes a log entry, e.g., submitted by an administrator or generated automatically in response to one or more previously detected attacks. In some implementations, data stored in the reference database 218 may be linked to a corresponding rule tree through the rule editor 202.

Figure 3:
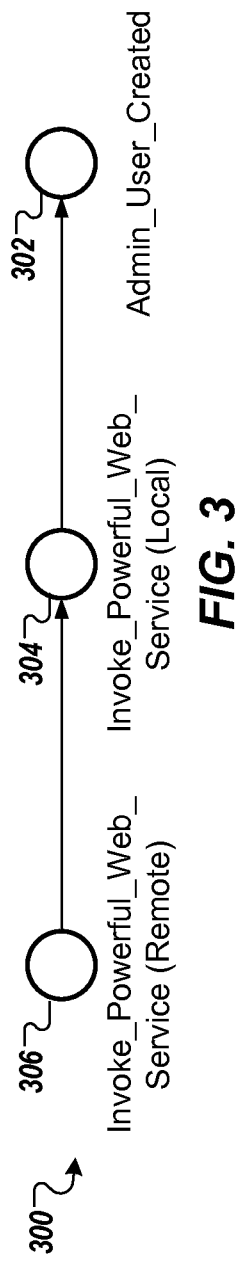
FIG. 3 depicts an example rule tree in accordance with implementations of the present disclosure.

FIG. 3 depicts an example rule tree 300 in accordance with implementations of the present disclosure. In this example, the rule tree 300 includes a first node 302, a second node 304, and a third node 306. The third node 302 is the root of the rule tree 300; and the first node 306 is the leaf of the tree. So, as described above, the dispatcher 204 of the system 200 may prompt the analysis module 206 to initiate an evaluation in response to determining that the rule part corresponding to the first node 302 has been fulfilled by recorded log data.

The rule tree 300 may be constructed through the rule editor 202 by a user operating the administrator device 106. For example, consider the follow non-limiting use case where the user is notified that a new vulnerability has been found in a business application distributed across the server devices 104*a-n* on the shared platform 105. In this example, the vulnerability involves a web service which is "over-privileged," allowing the following attack scenario: a malicious user has found a way to obtain administrator privileges on System A. The malicious user does not have a privileged account on System A, but he has a standard account on System B. From System B, the malicious user can launch a request to System A through a web-service call executed with administrator privileges. The malicious user then launches, through the web service, a request to create a new account on System A with administrator privileges. Since the malicious user is the one who created the System A account, he can now log into System A as an administrator. The rule tree 300 provides an appropriate sequence of rule-part nodes 302-306 bound by dependency links 308-310 for modeling the above-described vulnerability of the distributed business application.

In this example, the first node 302 (the leaf node) of the rule tree 300 corresponds to the following rule part defined through the rule editor 202:

| Rule Part Name | Admin_User_Created |  |
|---|---|---|
| Event Type | Admin_Authorization_Assigned |  |
| Attributes | Local System ID | System A |

The above-defined rule part relates to log data indicating that a user account has been granted administrator privileges on System A. The event type "Admin_Authorization_Assigned" describes any action involving the assignment of administrator privileges to a user account. The attribute "Local System ID" set to a value "System A" further specifies that log files associated with System A will be monitored for log data relevant to this rule part.

In this example, the second node 304 of the rule tree 300 corresponds to the following rule part defined through the rule editor 202:

| Rule Part Name | Invoke_Web_Service_(local) |  |
|---|---|---|
| Event Type | Remote_Call_Method_Invoked |  |
| Attributes | Received From | Not_Blank |
|  | Local System ID | System A |

The above-defined rule part relates to log data indicating remote calls through the web service from systems other than System A. The event type "Remote_Call_Method_Invoked" describes any action involving a remote call through the web service. The attribute "Received From" set to a value of "Not_Blank" further specifies the remote call is received from a system other than System A, excluding local usages of the web service; and the attribute "Local System ID" set to a value of "System A" further specifies that log files associated with System A will be monitored for log data relevant to this rule type.

The rule part of the first node 302 and the rule part of the second node 304 are bound by the following dependency link 308:

| Dependency Link Between First and Second Nodes | |
|---|---|
| Condition 1 | From User (Node 302) = From User (Node 304) |
| Condition 2 | Time (Node 304) > Time (Node 302) |

In this example, the dependency link 308 effectively filters out administrator account creations carried out under a different user account than the one invoking System A through the web service. In particular, Condition 1 of the dependency link 308 specifies that the user account used to assign the administrator privileges, as set forth in the rule part of the first node 302, must be the same user account used to make the remote call through the web service, as set forth in the rule part of the second node 304. Condition 2 of the dependency link 308 further specifies that the event of the second node 304 must be recorded prior to the event of the first node 302.

In this example, the third node 306 of the rule tree 300 corresponds to the following rule part defined through the rule editor 202:

| Rule Part Name | Invoke_Web_Service_(remote) |  |
|---|---|---|
| Event Type | Remote_Call_Method_Invoked |  |
| Attributes | Local System ID | Not_System A |
|  | Received From | Not_Blank |

Similar to the rule part of the second node 304, the above-defined rule part relates to log data indicating remote calls through the web service from systems other than System A. As noted above, the event type "Remote_Call_Method_Invoked" describes any action involving a remote call through the web service. The attribute "Received From" set to a value of "Not_Blank" further specifies the remote call is received from a system other than System A, excluding local usages of the web service; and the attribute "Local System ID" set to a value of "Not_System A" further specifies that log files associated with all systems other than System A will be monitored for log data relevant to this rule type.

The rule part of the first node 302 and the rule part of the second node 304 are bound by the following dependency link 310:

| Dependency Link Between Second and Third Nodes | |
| --- | --- |
| Condition | Time (Node 306) > Time (Node 304) |

In this example, the dependency link 310 includes just one condition specifying that the event of the third node 306 must be recorded prior to the event of the second node 304.

Figure 4:
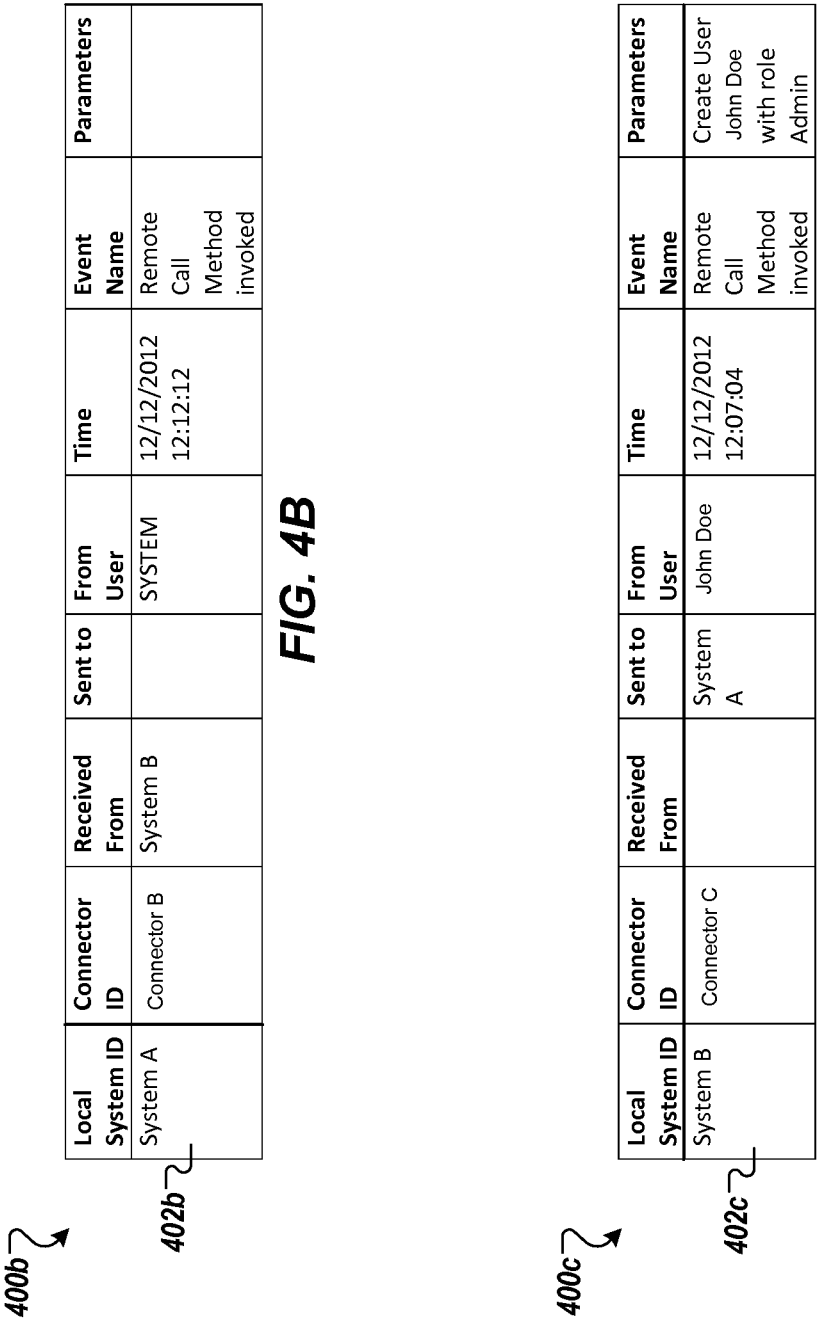
FIGS. 4A-4C depict example log files in accordance with implementations of the present disclosure.

FIGS. 4A-4C depict example log files 400a-c in accordance with implementations of the present disclosure. The log files 400a-c are illustrated to further describe various implementations of the present disclosure in context of the use-case set forth above in connection with the rule tree 300. As shown in FIG. 4A, the log file 400a is associated with System A and monitored by Connector A. In this example, the log file 400a is a security log recording actions such as: account log on, account log off, incorrect password entry, user account creation, and (notably) assignment of administrator privileges to a user account. As shown in FIG. 4B, the log file 400b is associated with System A and monitored by Connector B. In this example, the log file 400b records all web service calls sent from and passed to System A. As shown in FIG. 4C, the log file 400c is associated with System B and monitored by Connector C. In this example, the log file 400c records all web service calls sent from and passed to System B. Log data recorded in the data files 400a-c details the following attack sequence introduced in use-case presented above:

| Date | Time | Action |
| --- | --- | --- |
| Dec. 12, 2012 | 12:07:04 | No. 1: Remote call sent from System B to create new user account (JohnDoe) on System A. |
| | 12:12:12 | No. 2: Remote call received at System A to create new user account (JohnDoe) on System A. |
| | 12:13:13 | No. 3: New user account (JohnDoe) created and assigned administrator privileges. |
| Dec. 13, 2012 | 17:05:06 | No. 4: Login by new user account (JohnDoe). |

In this example, a malicious user has created the JohnDoe account with administrator privileges on System A through a remote call through the web service from System B (see Action Nos. 1-3). At Action No. 1, recorded at log line 402c of log file 400c, the malicious user sends the remote call from System B to System A with instructions to create a new user account with administrator privileges. At Action No. 2, recorded at log line 402b of log file 400b, System A receives the remote call from System B. At Action No. 3, recorded at log line 402a of log file 400a, System A assigns administrator privileges to the new JohnDoe account in accordance with instructions from the remote call. At Action No. 4, recorded at log line 404a of log file 400a, the malicious user logs in to System A using the JohnDoe account with administrator privileges.

The rule parts of the nodes 302-306 provided in the rule tree 300 correspond to the log data recorded in the log files 400a-c. In particular, the rule part of the first node 302 relates to the log data recorded at log line 402a of the log file 400a; the rule part of the second node 304 relates to the log data recorded at log line 402b of the log file 400b; and the rule part of the third node 306 relates to the log data recorded at log line 402c of the log file 400c. Thus, the rule tree 300 can be used by the dispatcher 204 and the analysis module 206 of the system 200 to facilitate attack monitoring on the distributed business application. For example, the dispatcher 204 can monitor the log files 400a-c and screen the log lines for relevant log data (e.g., log data recorded at log lines 402a-c, but not 404a) based on the rule parts of the nodes 302-306. In response to detecting a log data that fulfills the rule part of the first node 302—the leaf node of the rule tree 300—the dispatcher 204 may prompt the analysis module 206 to evaluate the relevant log data screened by the dispatcher 204. In this example, the relevant log data exactly corresponds to the sequence set forth in the rule tree 300, which would result in a determination by the analysis module 206 that an attack is likely to have taken place.

Figure 5:
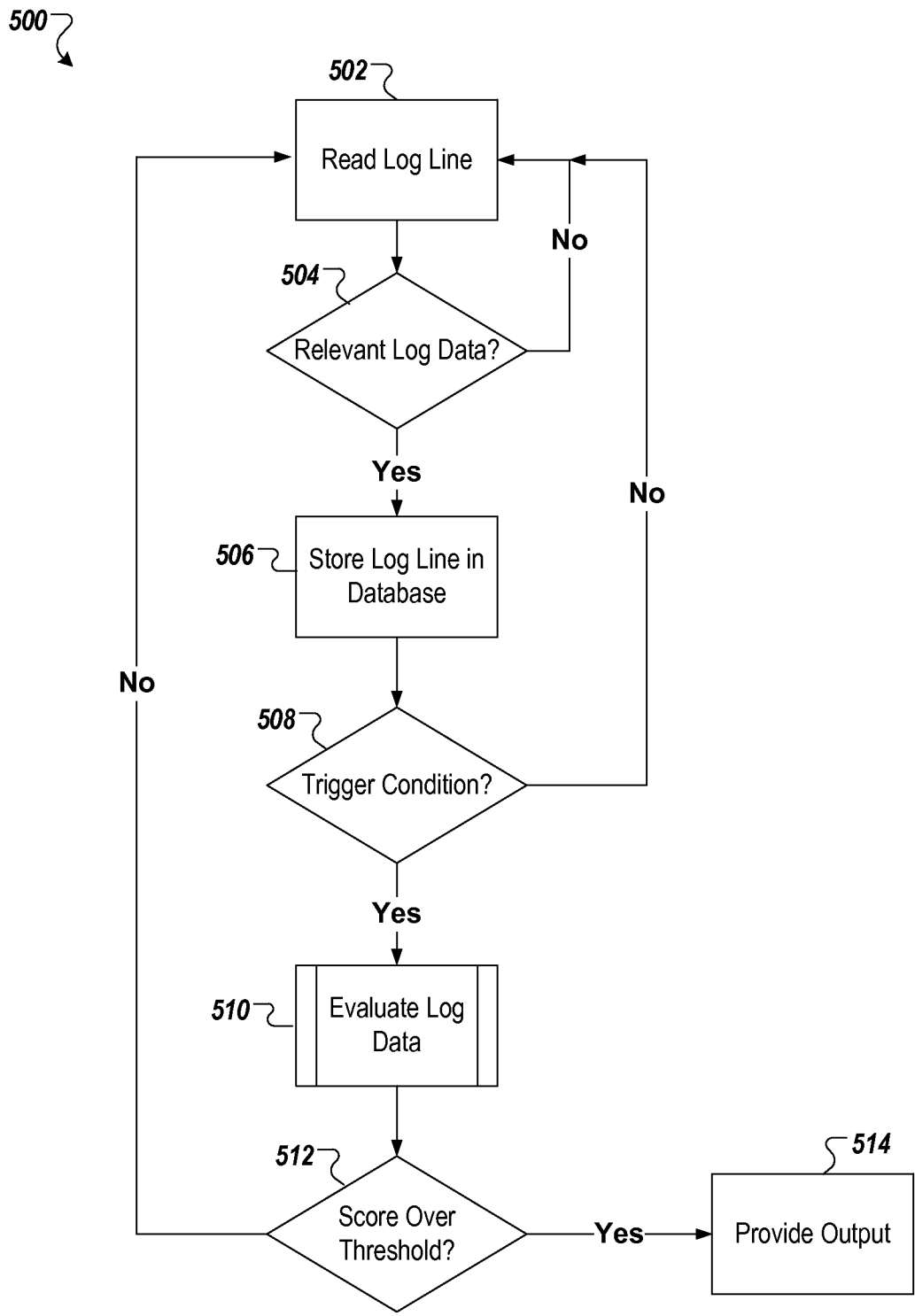
FIG. 5 depicts an example process in accordance with implementations of the present disclosure.

FIG. 5 depicts an example process 500 that can be executed in accordance with implementations of the present disclosure. In some implementations, the example process 500 can be realized using one or more computer-executable applications (e.g., networked application) executed using one or more computing devices (e.g., a client device, a server device, and an administrator device). In some implementations the example process 500 can be executed by various components of the system 200 of FIG. 2.

The process 500 starts by reading a log line (502). In some implementations, the log line can be provided through a connector (e.g., connectors 210a-n) monitoring a data source (e.g., data sources 212a-n). If the log line contains relevant log data (504), the log line is stored in a log database (506) (e.g., log database 214). If the log line does not contain relevant log data (504), the log line may be discarded (e.g., deleted) and the next log line is read (502). In some implementations, relevant log data may include log data that corresponds to (or fulfills) one or more rule parts of a rule tree. As described above, a rule tree can be defined by a user to model a potential vulnerability in a distributed application. If the log line stored in the log database provides a trigger condition (508), relevant log data stored in the log database is evaluated over the sequence of rule parts and dependency links of one or more rule trees to provide an evaluation score (510). If the log line does not provide a trigger condition (508), the next log line is read (502). In some examples, a trigger condition may be provided if data recorded in the log line fulfills a rule part corresponding to a leaf node in the rule tree. In some examples, evaluating the relevant log data includes applying the log data to the rule tree through a suitable pattern matching algorithm. If the evaluation score is less than a predetermined threshold value (512), the next log line is read (502). If the evaluation score is greater than the predetermined threshold value (512), output is provided (514) to a user (e.g., a user operating the administrator device 106) including indicating the attack. In some examples, such output may include the evaluation score and/or information related to the rule tree that is stored in a reference database (e.g., the reference database 218).

Figure 6:
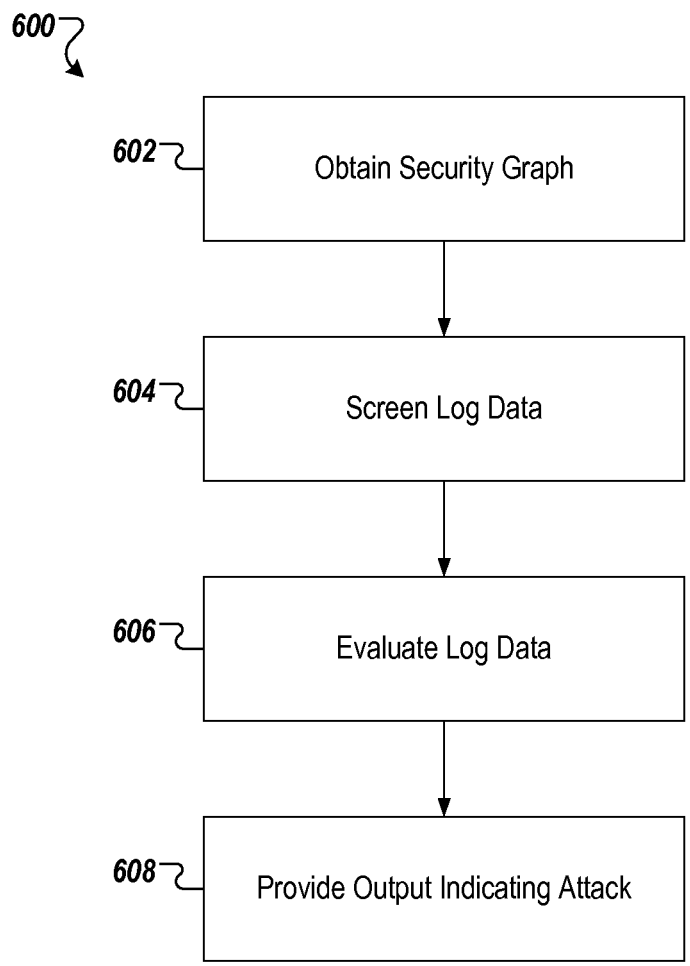
FIG. 6 depicts an example process that can be executed in accordance with implementations of the present disclosure.

FIG. 6 depicts another example process 600 that can be executed in accordance with implementations of the present disclosure. In some implementations, the example process 600 can be realized using one or more computer-executable applications (e.g., networked application) executed using one or more computing devices (e.g., a client device, a server device, and an administrator device). In some implementations the example process 600 can be executed by various components of the system 200 of FIG. 2.

According to the example process 600, a security graph associated with an attack vulnerability of a distributed application (e.g., a distributed business application) is obtained (602). In some examples, the security graph is provided in the form of a rule tree including a logical sequence of rule parts represented by nodes that are bound by dependency links. In response to receiving the security graph, log data generated during operation of the distributed application is screened (604) to selectively obtain relevant log data corresponding to the security graph. In some examples, log data is determined to be relevant if it corresponds to one or more discrete rule parts of a rule tree. In some examples, relevant log data can be stored in a log database and all other log data can be discarded. The relevant log data is evaluated (606) based on the rule tree to provide an evaluation score. In some examples, evaluation of the relevant log data can be prompted by detection of a trigger condition. If the evaluation score is greater than a predetermined threshold value, output indicating an attack on the distributed application can be provided to a user (608).

Figure 7:
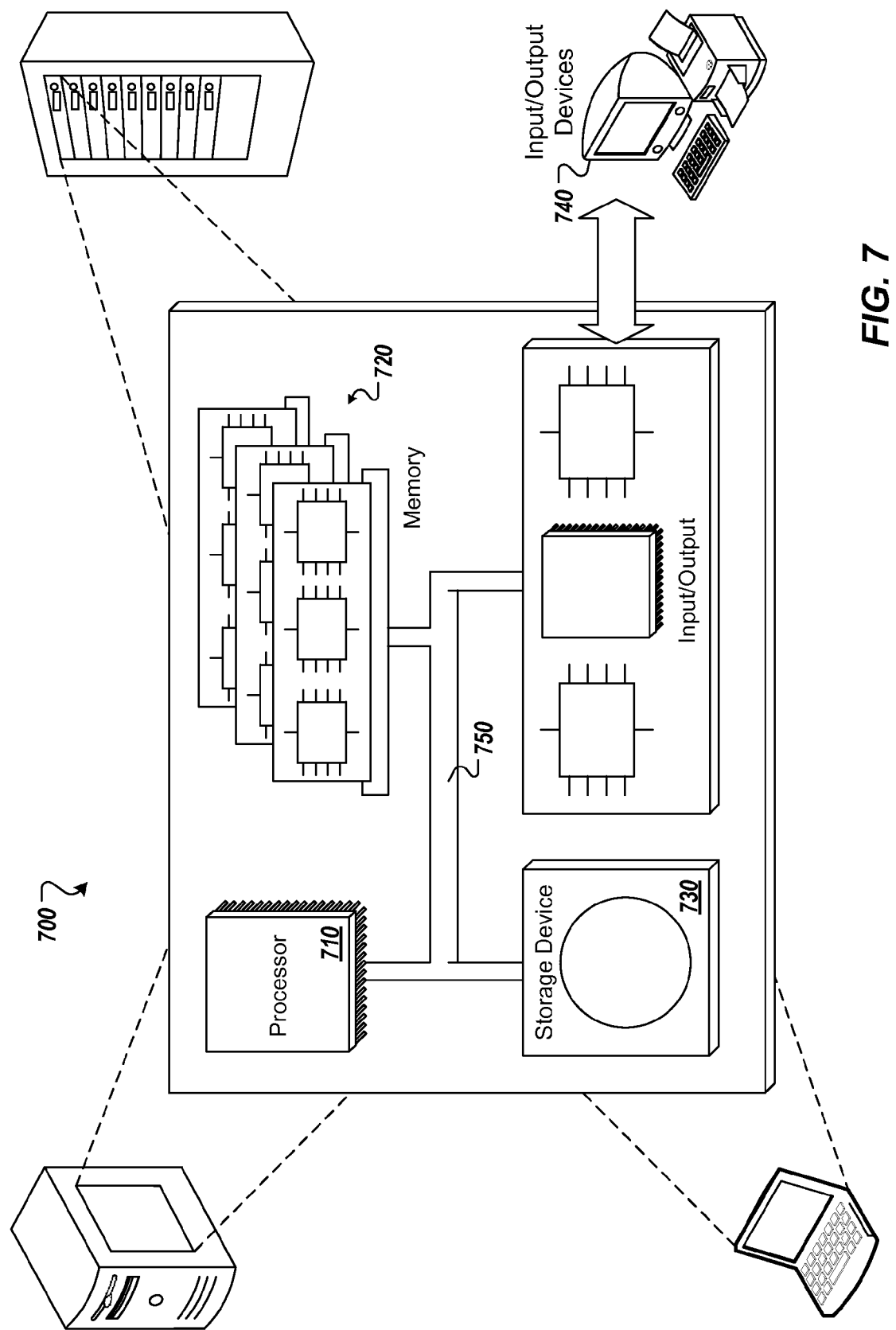
FIG. 7 is a schematic illustration of example computer systems that can be used to execute implementations of the present disclosure.

Referring now to FIG. 7, a schematic diagram of an example computing device 700 is provided. The device 700 can be used for the operations described in association with the implementations described herein. For example, the device 700 may be included in any or all of the server components discussed herein. The device 700 includes a processor 710, a memory 720, a storage device 730, and an input/output device 740. Each of the components 710, 720, 730, 740 are interconnected using a device bus 750. The processor 710 is capable of processing instructions for execution within the device 700. In one implementation, the processor 710 is a single-threaded processor. In another implementation, the processor 710 is a multi-threaded processor. The processor 710 is capable of processing instructions stored in the memory 720 or on the storage device 730 to display graphical information for a user interface on the input/output device 740.

The memory 720 stores information within the device 700. In one implementation, the memory 720 is a computer-readable medium. In one implementation, the memory 720 is a volatile memory unit. In another implementation, the memory 720 is a non-volatile memory unit. The storage device 730 is capable of providing mass storage for the device 700. In one implementation, the storage device 730 is a computer-readable medium. In various different implementations, the storage device 730 may be a floppy disk device, a hard disk device, an optical disk device, or a tape device. The input/output device 740 provides input/output operations for the device 700. In one implementation, the input/output device 740 includes a keyboard and/or pointing device. In another implementation, the input/output device 740 includes a display unit for displaying graphical user interfaces.

The features described can be implemented in digital electronic circuitry, or in computer hardware, firmware, software, or in combinations of them. The apparatus can be implemented in a computer program product tangibly embodied in an information carrier, e.g., in a machine-readable storage device, for execution by a programmable processor; and method steps can be performed by a programmable processor executing a program of instructions to perform functions of the described implementations by operating on input data and generating output. The described features can be implemented advantageously in one or more computer programs that are executable on a programmable device including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors of any kind of computer. Generally, a processor will receive instructions and data from a read-only memory or a random access memory or both. Elements of a computer can include a processor for executing instructions and one or more memories for storing instructions and data. Generally, a computer can also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the features can be implemented on a computer having a display device such as a CRT (cathode ray tube) or LCD (liquid crystal display) monitor for displaying information to the user and a keyboard and a pointing device such as a mouse or a trackball by which the user can provide input to the computer.

The features can be implemented in a computer device that includes a back-end component, such as a data server, or that includes a middleware component, such as an application server or an Internet server, or that includes a front-end component, such as a client computer having a graphical user interface or an Internet browser, or any combination of them. The components of the device can be connected by any form or medium of digital data communication such as a communication network. Examples of communication networks include, e.g., a LAN, a WAN, and the computers and networks forming the Internet.

The computer device can include clients and servers. A client and server are generally remote from each other and typically interact through a network, such as the described one. The relationship of client and server arises by virtue of computer programs running on the respective computers and having a client-server relationship to each other.

In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other implementations are within the scope of the following claims.

A number of implementations of the present disclosure have been described. Nevertheless, it will be understood that various modifications may be made without departing from the spirit and scope of the present disclosure. Accordingly, other implementations are within the scope of the following claims.

What is claimed is:

1. A computer-implemented method for providing application attack monitoring, the method being executed using one or more processors and comprising:

obtaining, by the one or more processors, a security graph model associated with an attack vulnerability of a distributed application, the security graph model comprising a plurality of rule parts;

screening, by the one or more processors, log data obtained by a plurality of connectors to selectively obtain relevant log data corresponding to one or more of the rule parts, each connector being in communication with a respective component of the distributed application;

evaluating, by the one or more processors, the relevant log data based on the security graph model to provide an evaluation score that reflects a likelihood that an attack corresponding to the attack vulnerability modeled by the security graph model has taken place; and in response to determining that the evaluation score is greater than a predetermined threshold, providing, by the one or more processors, output indicating an attack on the distributed application.

2. The method of claim 1, wherein obtaining the security graph model comprises constructing the security graph model based on user-input received through a graphical user interface.

3. The method of claim 1, wherein the security graph model comprises a rule tree, and wherein the rule parts are represented in the rule tree as nodes arranged in a hierarchical configuration.

4. The method of claim 3, wherein the nodes in the rule tree are connected by dependency links representing a relationship between the rule parts.

5. The method of claim 1, wherein the log data corresponds to a plurality of events observed during execution by one or more components of the distributed application, and wherein screening the log data comprises identifying one or more events that correspond to events referenced in the rule parts of the security graph model.

6. The method of claim 5, wherein screening the log data further includes storing the log data associated with the identified events in a log database, and discarding other log data.

7. The method of claim 1, further comprising prompting evaluation of the relevant log data in response to detecting a trigger condition in the log data.

8. The method of claim 7, wherein the trigger condition corresponds to a predetermined event described by a rule part of the security graph model.

9. The method of claim 1, wherein evaluating the relevant log data based on the security graph model comprises executing a pattern matching algorithm.

10. The method of claim 1, wherein providing output comprises:
accessing a reference database to obtain information related to the attack vulnerability associated with the security graph model; and
including the obtained information and the evaluation score in the output.

11. A non-transitory computer-readable storage medium coupled to one or more processors and having instructions stored thereon which, when executed by the one or more processors, cause the one or more processors to perform operations for providing application attack monitoring, the operations comprising:

obtaining, by the one or more processors, a security graph model associated with an attack vulnerability of a distributed application, the security graph model comprising a plurality of rule parts;

screening, by the one or more processors, log data obtained by a plurality of connectors to selectively obtain relevant log data corresponding to one or more of the rule parts, each connector being in communication with a respective component of the distributed application;

evaluating, by the one or more processors, the relevant log data based on the security graph model to provide an evaluation score that reflects a likelihood that an attack corresponding to the attack vulnerability modeled by the security graph model has taken place; and in response to determining that the evaluation score is greater than a predetermined threshold, providing, by the one or more processors, output indicating an attack on the distributed application.

12. The computer-readable storage medium of claim 11, wherein the security graph model comprises a rule tree, and wherein the rule parts are represented in the rule tree as nodes arranged in a hierarchical configuration.

13. The computer-readable storage medium of claim 11, wherein the log data corresponds to a plurality of events observed during execution by one or more components of the distributed application, and wherein screening the log data comprises identifying one or more events that correspond to events referenced in the rule parts of the security graph model.

14. The computer-readable storage medium of claim 11, wherein the operations further comprise prompting evaluation of the relevant log data in response to detecting a trigger condition in the log data.

15. A system, comprising:
a client-side computing device; and
a computer-readable storage device coupled to the client-side computing device and having instructions stored thereon which, when executed by the client-side computing device, cause one or more processors of the client-side computing device to perform operations for providing application attack monitoring, the operations comprising:

obtaining, by the one or more processors, a security graph model associated with an attack vulnerability of a distributed application, the security graph model comprising a plurality of rule parts;

screening, by the one or more processors, log data obtained by a plurality of connectors to selectively obtain relevant log data corresponding to one or more of the rule parts, each connector being in communication with a respective component of the distributed application;

evaluating, by the one or more processors, the relevant log data based on the security graph model to provide an evaluation score that reflects a likelihood that an attack corresponding to the attack vulnerability modeled by the security graph model has taken place; and in response to determining that the evaluation score is greater than a predetermined threshold, providing, by the one or more processors, output indicating an attack on the distributed application.

16. The system of claim 15, wherein the security graph model comprises a rule tree, and wherein the rule parts are represented in the rule tree as nodes arranged in a hierarchical configuration.

17. The system of claim 15, wherein the log data corresponds to a plurality of events observed during execution by one or more components of the distributed application, and wherein screening the log data comprises identifying one or more events that correspond to events referenced in the rule parts of the security graph model.

18. The system of claim 15, wherein the operations further comprise prompting evaluation of the relevant log data in response to detecting a trigger condition in the log data.

* * * * *